E. DEMBOWSKY.
FREE FLOW AND PACKINGLESS VALVE.
APPLICATION FILED FEB. 3, 1919.

1,312,839.

Patented Aug. 12, 1919.

Inventor.
Emil Dembowsky,
By Frederick V. Winters
Attorney.

UNITED STATES PATENT OFFICE.

EMIL DEMBOWSKY, OF METUCHEN, NEW JERSEY.

FREE-FLOW AND PACKINGLESS VALVE.

1,312,839. Specification of Letters Patent. Patented Aug. 12, 1919.

Application filed February 3, 1919. Serial No. 274,659.

*To all whom it may concern:*

Be it known that I, EMIL DEMBOWSKY, a citizen of the United States, residing at Metuchen, in the county of Middlesex and State of New Jersey, have invented certain new and useful Improvements in Free-Flow and Packingless Valves, of which the following is a full, clear, and exact specification.

This invention relates to valves, and has for its object to produce a valve especially adapted for use in handling acids or other fluids which attack and destroy packing when it is used in the valves. The aim of this invention is, therefore, to produce a valve which does not require packing.

Another object is to arrange the valve in the casing in such a way that when open said valve will be entirely out of the way of the passage of the fluid from the intake to the outlet of the casing, thus insuring free and unrestricted flow through said valve casing. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
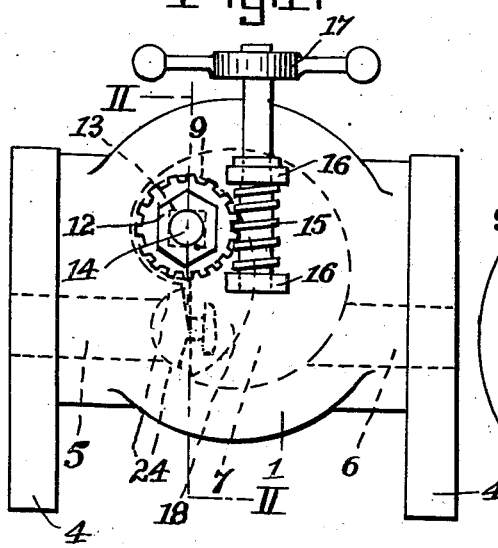
Figure 1 is a side elevation of a valve casing embodying the invention.

The main portion 1 of the casing is preferably made integral with the flanges 4, while on one side of said casing there is a removable section 2 suitably sealed by a layer of metal 3 which is impervious to the action of the acid. The flanges 4 may be provided with attaching openings 40 for securing the valve casing between a source of supply and a receptacle for the discharge, as will be readily understood although the supply and discharge are not shown.

In the casing there is an intake passage 5 and an outlet passage 6, said passages being preferably in line with one another so that one constitutes a continuation of the other. The main cavity 7 of the casing intersects the two passages 5 and 6, as shown in Fig. 3, and has an offset portion 8 at one side or above the line of the said passages. In said offset cavity 8 a valve-carrying arm 9 is pivoted by means of an angularly extending swivel shank 10 which is tapered to fit a correspondingly tapered bearing in the casing, as illustrated in Fig. 2. The outer end portion of the shank 10 may be squared, as indicated at 13, Fig. 1, to receive a worm gear 11, while the extremity of said shank may be screw-threaded, as at 14, Fig. 2, to receive a nut 12 which acts through the gear 11 to tighten the shank in the bearing and prevent leakage without the use of packing around said shank or between it and its bearing. A worm 15, mounted between two spaced ears 16 on the casing, meshes with the worm gear and is provided with an operating handle 17 for turning the valve-carrying arm from closed position illustrated in solid lines in Fig. 3 to the open position indicated by dotted lines in the same figure.

The valve proper 19 is loosely swiveled, as at 20, Fig. 3, to the outer or free end portion 18 of the arm 9, so that said valve will seat itself firmly in the valve seat 24 leading to the outlet passage 6 when the arm 9 is swung to closed position. When the valve arm is moved to open position, as indicated in dotted lines in Fig. 3, it is withdrawn entirely within the offset cavity 8 of the casing where it is out of the way of the fluid passing from intake to outlet through the casing, so that free and unrestricted flow is insured.

Figure 2:
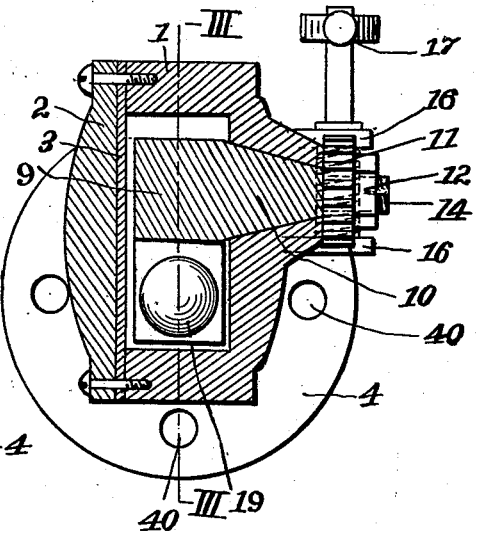
Fig. 2 is a section on the line II—II of Fig. 1.
Figure 3:
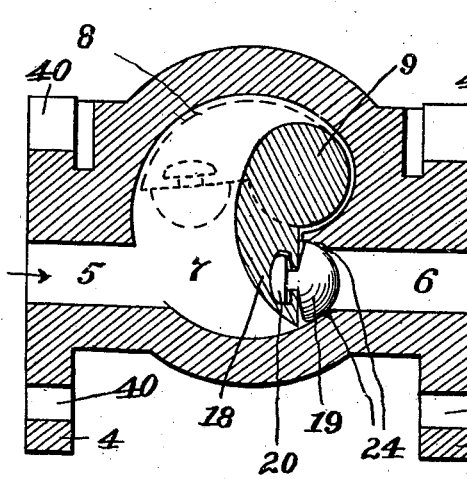
Fig. 3 is a section on the line III—III of Fig. 2.
Figure 4:
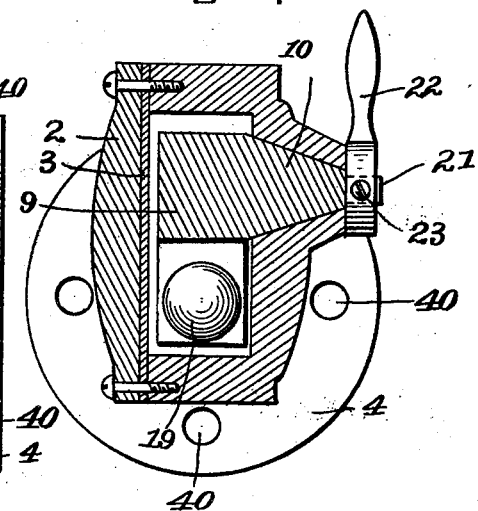
Fig. 4 is a view similar to Fig. 2 but showing a modified form of operating device for the valve.

In lieu of the worm gear and worm of Figs. 1 and 2, a straight handle 22 may be placed on the projecting end portion 21 of the swivel shank 10 of the valve arm 9, so as to abut directly against the casing, as shown in Fig. 4, said handle being retained in position by a set screw 23 or otherwise.

Having thus described my invention, what I claim as new and desire to secure by Letters Patent of the United States is:—

1. The combination with a valve casing having a bearing, of a valve having a tapered swivel shank arranged in said bearing, a gear on the outer end portion of the shank, operating means including another gear meshing with the gear on the shank for turning the valve, and tightening means to act upon the shank through the gear thereon for sealing the bearing.

2. The combination with a valve casing having a bearing, of a valve having a tapered swivel shank arranged in said bearing, a worm gear on the outer end portion of the shank, an operating shaft carried by the casing, a worm on said shaft meshing with said worm gear, and a nut on the extremity of the tapered shank for acting through the worm gear to tighten said shank in its bearing.

In testimony whereof I have signed my name to this specification.

EMIL DEMBOWSKY.

Copies of this patent may be obtained for five cents each, by addressing the "Commissioner of Patents, Washington, D. C."